(12) United States Patent
Gontar

(10) Patent No.: US 6,446,344 B1
(45) Date of Patent: Sep. 10, 2002

(54) SAFETY LATCH FOR HAND TOOL

(75) Inventor: Ilya Gontar, Reseda, CA (US)

(73) Assignee: Olympia Group, Inc., City of Industry, CA (US)

( * ) Notice: Subject to any disclaimer, the term of this patent is extended or adjusted under 35 U.S.C. 154(b) by 0 days.

(21) Appl. No.: 09/872,555

(22) Filed: Jun. 1, 2001

(51) Int. Cl.⁷ .............................................. B26B 13/16
(52) U.S. Cl. ....................................................... 30/262
(58) Field of Search ........................... 30/262, 261, 179

(56) References Cited

U.S. PATENT DOCUMENTS

| | | | | |
|---|---|---|---|---|
| 1,741,109 A | * | 12/1929 | Heimerdinger | 30/262 |
| 2,544,197 A | * | 3/1951 | Vosbikian et al. | 30/262 |
| 4,077,099 A | | 3/1978 | Cantini | 29/38 C |
| 4,109,504 A | | 8/1978 | Rommel | 72/407 |
| 4,538,485 A | | 9/1985 | Saila | 81/336 |
| 5,026,349 A | | 6/1991 | Schmitz et al. | 604/134 |
| 5,251,524 A | | 10/1993 | Clifford | 83/383 |
| 5,307,553 A | | 5/1994 | Frohlich | 29/566.2 |
| 5,674,244 A | | 10/1997 | Mathys | 606/208 |
| 5,797,533 A | | 8/1998 | Lee | 227/8 |
| 5,902,015 A | | 5/1999 | Allcock | 297/463.1 |

* cited by examiner

Primary Examiner—Douglas D. Watts
(74) Attorney, Agent, or Firm—Moser, Patterson & Sheridan, L.L.P.

(57) ABSTRACT

A safety latch for a hand tool is provided. According to the present invention, the safety latch serves to hold the two handles of a safety tool in proximity to one another so as to prevent the hand tool from pivoting, and thereby maintaining the hand tool in its closed position. A latching member is first connected to the first handle. The latching member is capable of moving from a disengaged position to an engaged position. Next, a receiving member is connected to the second handle. The receiving member receives the latching member in its engaged position. In this position, the handles of the hand tool are maintained in proximity such that the tool implements of the hand tool are maintained in the closed position. Finally, a biasing member is supplied to act against the latching member. The biasing member biases the latching member in its disengaged position. Operationally, the biasing member returns the latching member to its disengaged position when the handles are drawn together, thereby allowing the hand tool to be efficiently released into its open position for use.

17 Claims, 3 Drawing Sheets

SAFETY LATCH FOR HAND TOOL

BACKGROUND OF THE INVENTION

1. Field of the Invention

The present invention generally relates to the art of hand tools. More specifically, it relates to hand tools having a safety latch feature for maintaining the hand tool in a substantially closed position.

2. Background of the Related Art

The use of hand tools in various configurations for performing different tasks are known. For example, pliers-type tools having a pair of jaws for gripping objects are known. Likewise, various cutting tools such as clippers, scissors, metal cutters and pruners are known. Such hand tools typically have a pair of handles configured to be gripped by the human hand. The handles rotate about a pivot point such that contraction of the handles causes the tool implements to act upon an object. In the case of pliers, a pair of jaws acts to grip an object. In the case of cutting tools, a pair of blades acts to cut an object.

Those skilled in the art will recognize that hand tools present a danger of personal injury when left in the open position. In the case of a pliers-type tool, an extremity such as a finger could become caught between the jaws and compressed. In the case of a cutting tool, a finger or other body portion could be cut through inadvertent contact with one of the blades. Further, an open tool is an attractive nuisance to a small child, inviting a child to play with the tool, resulting in injury.

In the context of pliers, recent patents have disclosed locking devices for maintaining the pliers-type tool in a closed position. U.S. Pat. No. 4,538,485 (issued to Saila) and U.S. Pat. No. 5,674,244 (issued to Mathys) present pliers having locking features within the two handle means. In each case, one handle employs an arm having a serrated edge, while another handle employs a receiving member through which the serrated arm is ratcheted. Likewise, U.S. Pat. No. 5,902,015 (issued to Allcock) discloses a gripping device for holding a seatbelt in connection with a child safety seat. The gripping tool includes a safety latch for holding the gripping tool in a closed position.

The purpose for holding the above tools in a closed position is for gripping an object until the safety latch is released. For example, U.S. Pat. No. 5,674,244, entitled "Locking Device on A Pliers-Shaped Tool" has its primary application in surgery. (See Abstract). Essentially, the locking device of U.S. Pat. No. 5,674,244 allows a pliers-shaped tool to serve as a selectively adjustable and releasable clamp. However, such an application is without utility in the context of cutting devices. This is because cutting tools are only functional when they reciprocate against an object from an open to closed position.

In the context of cutting tools, a safety latch is needed which will efficiently maintain the cutting tool in a closed position during its unused state. Accordingly, it is an object of the present invention to provide a safety latch for a hand tool used for cutting by which the cutting tool may be maintained in a closed position while the tool is unused.

It is a further object of the present invention to provide a safety latch which is efficient in that it can be quickly released so as to open the hand cutting tool for cutting operations, and can quickly reset when cutting operations are concluded.

Yet, a further object of the present invention in one embodiment is to provide a safety latch which is spring biased to accommodate the efficient operation of the safety latch.

Still a further object of the present invention is to afford a safety latch which is economical to manufacture yet sturdy enough to withstand day-to-day use.

SUMMARY OF THE INVENTION

The present invention generally discloses an apparatus for maintaining a hand tool in a closed position while in its unused state. According to the present invention, a safety latch is provided for holding the two handles of the safety tool in proximity to one another so as to prevent the hand tool from pivoting, and to maintain the hand tool in a closed position.

In the present invention, a latching member is first connected to the first handle. The latching member is capable of moving from a disengaged position to an engaged position.

Next, a receiving member is connected to the second handle. The receiving member receives the latching member in its engaged position. In this position, the handles of the hand tool are maintained in its closed position.

Finally, a biasing member is supplied to act against the latching member. The biasing member biases the latching member in its disengaged position. Operationally, the biasing member returns the latching member to its disengaged position when the handles are further drawn together, thereby allowing the hand tool to be released into its open position for use. In this manner, an efficient safety latch for a hand tool is provided.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention, and are therefore not to be considered limiting of the invention's scope. The invention admits to other equally effective embodiments.

DETAILED DESCRIPTION OF THE PREFERRED EMBODIMENT

Figure 1:
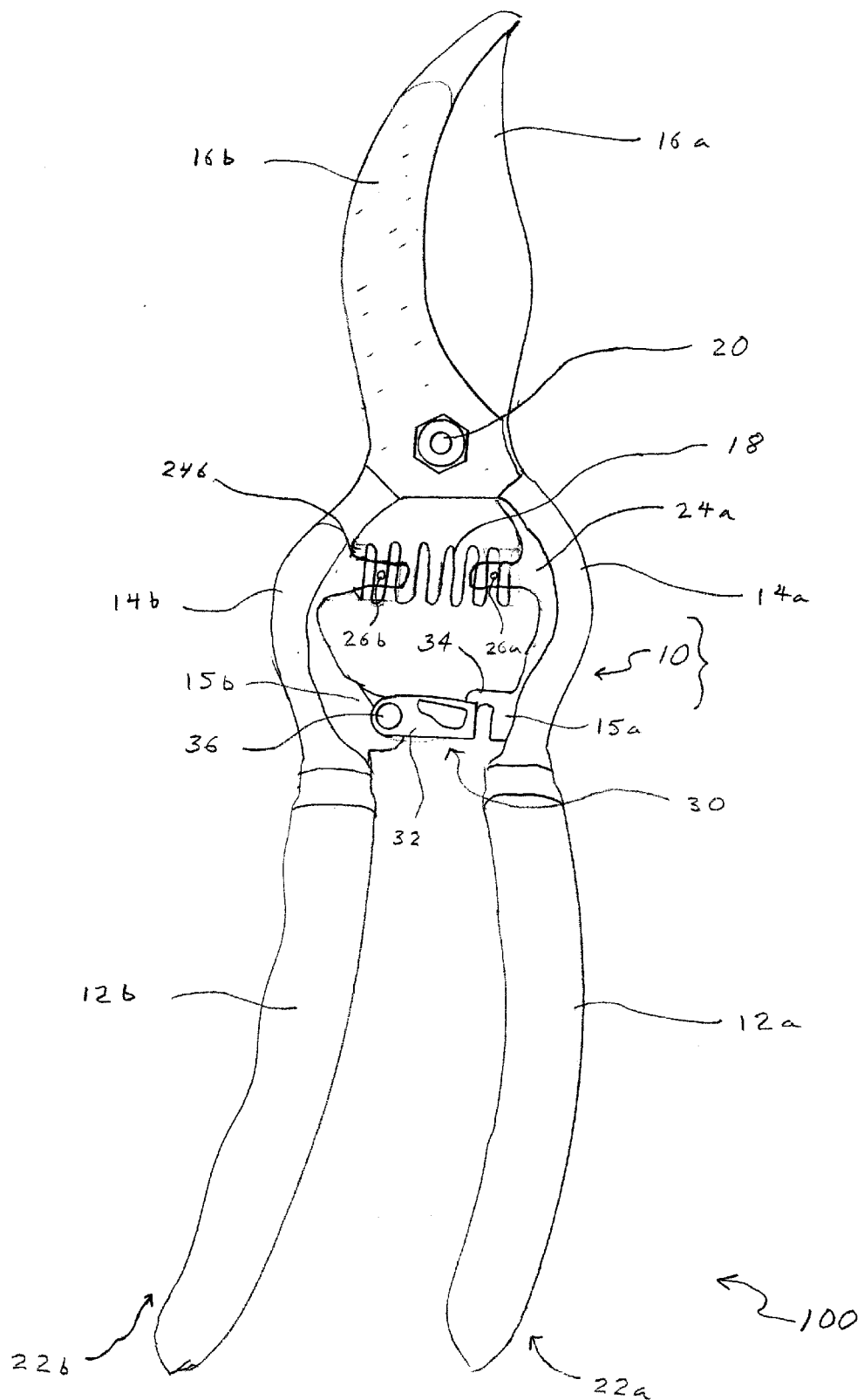
FIG. 1 is a side view of the safety latch of the present invention, incorporated into a hand tool for cutting. In this depiction, the safety latch is in its engaged position, maintaining the pruning tool in its closed position.

FIG. 1 illustrates one embodiment of the safety latch 10 of the present invention. In this figure, a safety latch 10 is incorporated into a hand tool 100 used for cutting. More specifically, a safety latch 10 is incorporated into a pruner 100, typically used for cutting small branches of plants (not shown). However, it will become obvious to one of ordinary skill in the art, based upon the present disclosure, that the safety latch 10 of the present invention would have utility in any hand tool wherein the two handles 22a and 22b are biased in an open position.

Figure 2:
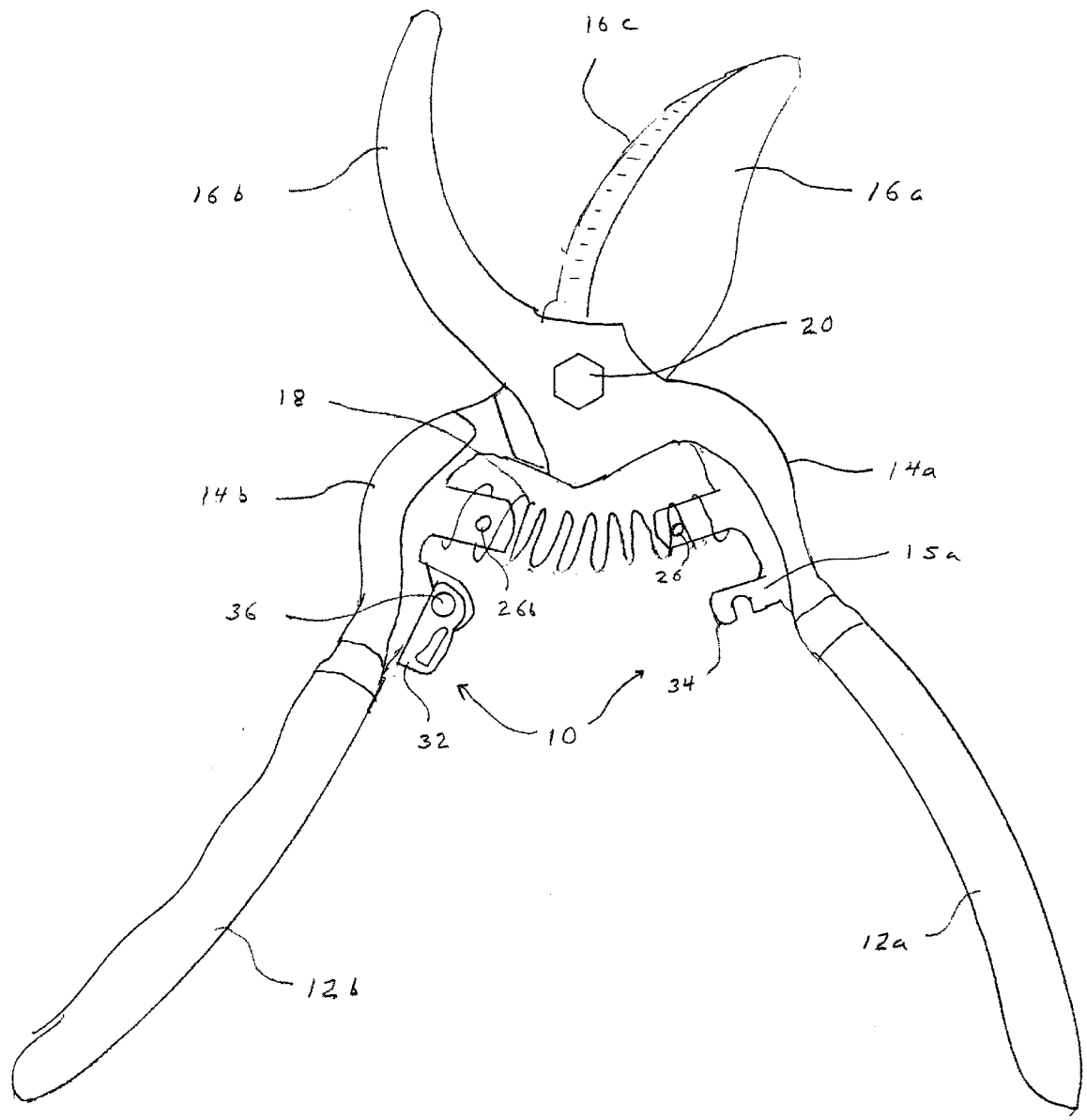
FIG. 2 is a side view of a safety latch of the present invention, with the safety latch disengaged from the receiving member. In this depiction, the safety latch is likewise incorporated into a hand tool for cutting Because the safety latch is in its disengaged position, the cutting tool is in its open state, ready for use.

FIG. 2 more fully demonstrates the biasing action against the two handles 22a and 22b. In the embodiment shown in FIG. 1 and FIG. 2, the handle-biasing member is a spring 18. The spring 18 has first and second opposite ends, each end being connected to a shaft portion 14a and 14b of the opposing handles 22a and 22b. In the embodiment disclosed, the opposite ends of the spring 18 are coiled about posts 24a and 24b which extrude from shaft portions 14a and 14b of the opposing handles 22a and 22b. A stop member 26a and 26b is also fabricated into the respective posts 24a and 24b in order to secure the spring 18 from becoming detached from the posts 24a and 24b.

In the preferred embodiment, the respective posts 24a and 24b are integral to the shaft portions 14a and 14b of the two handles 22a and 22b. However, those of ordinary skill in the art will understand that the posts 14a and 14b and the attached biasing spring 18 may be incorporated between the gripping portions 12a and 12b of the handles 22a and 22b. As an alternative embodiment, the biasing spring 18 could be incorporated around the pivot pin 20, and without the use of posts. (This embodiment, and others, is not shown).

Figure 3:
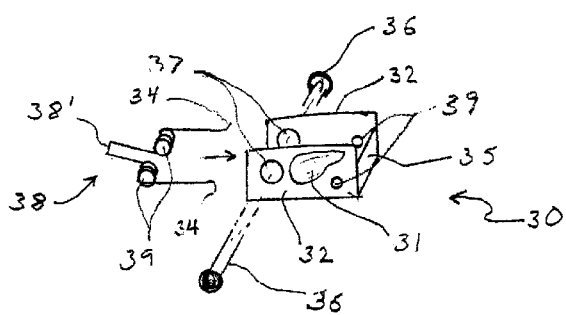
FIG. 3 is an exploded view of a latching member of the safety latch of the present invention. In this case, the torsion spring and the pivoting pin are removed from the latching member.

In the preferred embodiment, the safety latch 10 of the present invention first contains a latching member 30. The latching member 30 is shown in perspective view in FIG. 3. In this embodiment, the latching member 30 first contains opposite sidewalls 32. Fabricated within each sidewall 32 is a pin through-opening 37. The pin through-openings 37 receive pin 36. Sidewalls 32 may optionally include a raised or beveled portion, shown at 31 in FIG. 3. This beveled portion assists in the gripping of the latching member 30. The latching member 30 further includes an end wall 35 joining sidewalls 32.

The safety latch 10 also includes a biasing member 38. In the preferred embodiment, the biasing member is a torsion spring 38. Spring 38 has two ends 34. The two respective ends 34 fit into spring through-openings 39 within sidewalls 32.

Between the two ends 34 of the spring 38 are coils 39. Coils 39 receive pin 36 of the safety latch 10. Said torsion spring 38 also includes a strut portion 38' which resides against the shaft portion 14b of one handle 22.

Figure 4:
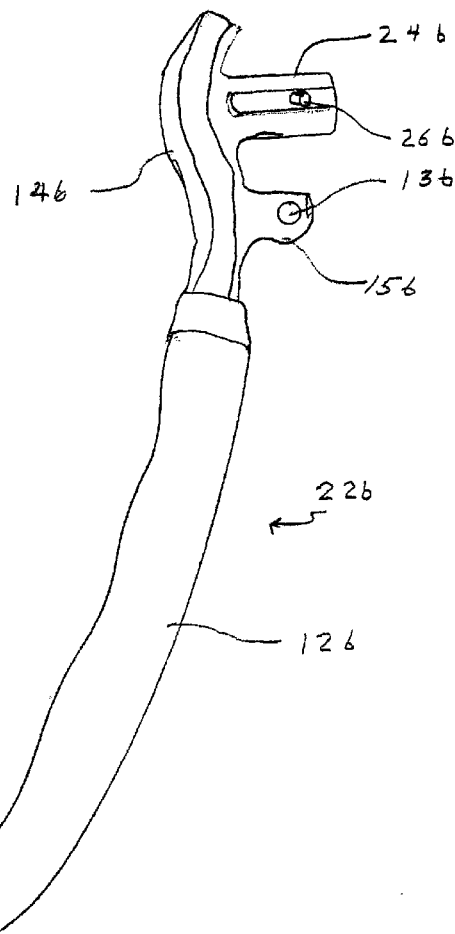
FIG. 4 depicts a perspective view of a handle, configured to receive a latching member of the safety hook of the present invention.

FIG. 4 depicts a handle 22b for receiving the latching member 30 and spring 38 of the safety latch 10 of the present invention. In the preferred embodiment, the handle 22b includes a rib 15b. Rib 15b is formed integral to the shaft portion 14b of the handle 22b. Within the rib 15b is a rib-through opening 13b. Rib-through opening 13b is for receiving pin 36, shown in FIG. 3.

Figure 5:
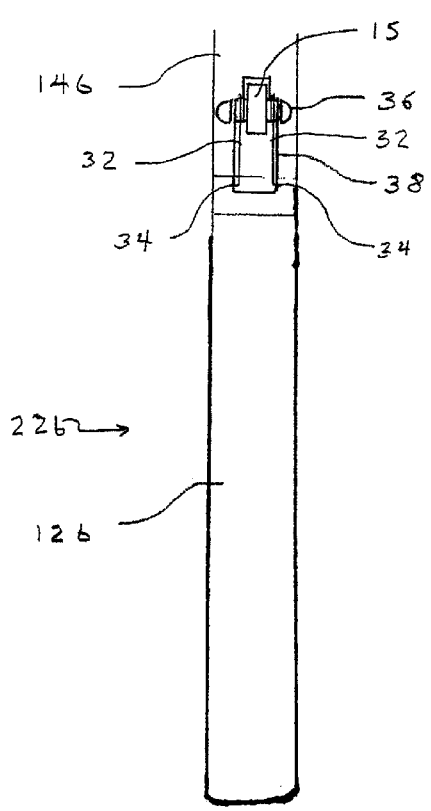
FIG. 5 demonstrates the handle of FIG. 4, with the latching member and biasing member incorporated into the handle.

Positioning of the latching member 30 and the biasing spring 38 onto the handle 22b is shown in FIG. 5. The latching member 30 is in its disengaged state in FIG. 5. In this disengaged state, the torsion spring 38 pulls the latching member 30 against the inside face of the shaft portion 14b. This positioning is shown more fully in FIG. 2.

Referring again to FIG. 1, the latching member 30 is engaged with a receiving member 34. In the preferred embodiment, receiving member 34 is also a rib 15a formed integral to the shaft portion 14a of handle 22a. In the preferred embodiment, receiving member 34 defines an L-hook. However, those of ordinary skill in the art will understand that the receiving member 34 may take various forms, including by example only a J-hook or a releasable latch. Receiving member 34 is aligned with latching member 30 so as to receive latching member 30 when handles 22a and 22b are drawn together. When joined, the latching member 30 and receiving member 34 form a safety latch 10 which maintains the hand tool 100 in a safe, closed position.

Those of ordinary skill in the art will appreciate that, in its open position, the sharpened edge 16c of blade 16a is exposed when the hand tool is in its open position. This, again, creates a risk of personal injury to the user. More seriously, it creates a risk of injury to a child who sees the hand tool as a toy. By engaging the safety latch 10 of the present invention, blades 16a and 16b are drawn together, and the risk of injury is minimized.

In order to use the cutting tool 100 shown in FIG. 1, it is necessary to disengage the safety latch 10. This can be done by squeezing on handle gripping portions 12a and 12b, drawing them together. Contracting the handles 22a and 22b serves to disengage the spring-tensioned connection between the latching member 30 and the receiving member 34. Because of the biased nature of the spring-tensioned connection, releasing the connection causes the latching member 30 to snap out of the receiving member 34, thereby causing a more efficient release of the safety latch 10.

While the foregoing is directed to some embodiments of the present invention, other and further embodiments of the invention may be devised without departing from the basic scope thereof, and the scope thereof is determined by the claims, as follows:

What is claimed is:

1. A safety latch for a hand tool, the hand tool having first and second handles for moving the hand tool about a pivot point from an open position to a closed position, and the hand tool being biased in its open position, the safety latch comprising:

a latching member connected to the first handle, the latching member moving from a disengaged position to an engaged position;

a biasing member for biasing the latching member in its disengaged position; and a hook connected to the second handle for receiving the latching member in its engaged position, whereby the hand tool is maintained in its closed position when the latching member is engaged with the receiving member;

wherein the latching member comprises:

a pin about which the latching member pivots from its disengaged position to its engaged position;

first and second opposite side walls, each of the first and second opposite side walls having a proximal end and a distal end, and each of the first and second opposite side walls having a pin through-opening at the proximal end for receiving the pin; and an end wall connected to the first and second opposite side walls at the respective distal ends, the end wall configured to be received by the hook when the latching member is in its engaged position;

and wherein each of the first and second handles of the hand tool includes a gripping portion distal to the pivot point of the hand tool, and a shaft portion proximal to the pivot point of the hand tool, the latching member being connected to the first handle of the hand tool at the shaft portion of the first handle, and the hook being connected to the second handle of the hand tool at the shaft portion of the second handle.

2. The safety latch of claim 1, wherein the hand tool is biased in its open position by means of a spring positioned between the first and second handles, the spring having a first end and a second end.

3. The safety latch of claim 2, wherein each of the shaft portions of the first and said second handles includes a post, the post of the shaft portion of the first handle receiving the first end of the spring, and the post of the shaft portion of the second handle receiving the second end of the spring.

4. The safety latch of claim 3, wherein:
the shaft portion of the first handle includes a through-opening also configured to receive the pin; and
the latching member is connected to the shaft portion of the first handle by means of the pin.

5. The safety latch of claim 4,
wherein the biasing member of the safety latch defines a spring, the spring comprising
a first end;
a second end;
at least one coiled portion between the first end and the second end of the spring, the coiled portion residing around the pin; and
wherein the first and second opposite side walls of the latching member further each include a spring through-opening whereby the first end of the spring is received within the spring through-opening of the first side wall of the latching member, and the second spring is received within the spring through-opening of the second side wall of the latching member.

6. The safety latch of claim 5, wherein the spring is tensioned so as to bias the latching member such that the end wall of the latching member is oriented towards the gripping portion of the first handle when the latching member is in its disengaged position, and wherein the spring includes:
a first coil proximal to the first side wall of the latching member;
a second coil proximal to the second side wall of the latching member; and
wherein the spring further includes a strut portion between the first coil and the second coil of the spring, the strut portion being retained proximal to the first handle of the hand tool.

7. The safety latch of claim 6, wherein at least one of each of the first and second opposite side walls of the latching member further includes a beveled portion to facilitate manipulation of the latching member from its disengaged position to its engaged position.

8. The safety latch of claim 4, wherein the hand tool is a cutting instrument.

9. The safety latch of claim 8, wherein the cutting instrument is a pruner.

10. The safety latch of claim 4, wherein the hand tool is a pliers-type tool.

11. A safety latch for a hand tool, the hand tool having first and second handles for moving the hand tool about a pivot point from an open position to a closed position, and the hand tool being biased in its open position by means of a spring positioned between the first and second handles, the safety latch comprising:
a latching member connected to the first handle, the latching member moving from a disengaged position to an engaged position, the latching member comprising:
first and second opposite side walls, each of the first and second opposite side walls having a proximal end and a distal end, and each of the first and second opposite side walls having a pin through-opening at the proximal end for receiving a pin;
a pin about which said latching member pivots from its disengaged position to its engaged position; and
an end wall connected to the first and second opposite side walls at the respective distal ends, the end wall configured to be received by the hook when the latching member is in its engaged position;
a biasing member for biasing the latching member in said disengaged position;
a receiving member connected to the second handle for receiving the latching member in its engaged position, the receiving member defining a hook, whereby the hand tool is maintained in its closed position when the latching member is engaged with the hook.

12. The safety latch of claim 11, wherein each of the first and second handles of the hand tool includes a gripping portion distal to the pivot point of the hand tool, and a shaft portion proximal to the pivot point of the hand tool;
the latching member being connected to the first handle of the hand tool at the shaft portion of the first handle; and
the receiving member being connected to the second handle of the hand tool at the shaft portion of the second handle.

13. The safety latch of claim 12, wherein
the shaft portion of the first handle includes a through-opening also configured to receive the pin; and
the latching member is connected to the shaft portion of the first handle by means of the pin.

14. The safety latch of claim 13 wherein said biasing member of said safety latch defines a spring, said spring comprising
a first end;
a second end;
at least one coiled portion between said first end and said second end of said spring, said coiled portion residing around said pin; and
wherein said first and second opposite side walls of said latching member further each include a spring through-opening whereby said first end of said spring is received within said spring through-opening of said first side wall of said latching member, and said second spring is received within said spring through-opening of said second side wall of said latching member.

15. The safety latch of claim 14 wherein said spring is tensioned so as to bias said latching member such that said end wall of said latching member is oriented towards the first handle when said latching member is in said disengaged position, and wherein at least one coiled portion of said spring includes
a first coil proximal to said first side wall of said latching member;
a second coil proximal to said second side wall of said latching member; and
wherein said spring further includes a strut portion between said first coil and said second coil, said strut portion being retained proximal to the first handle of the hand tool.

16. The safety latch of claim 15 wherein said cutting instrument is a pruner.

17. A safety latch for a hand tool, the hand tool having first and second handles for moving the hand tool about a pivot point from an open position to a closed position, the first handle having a pin through-opening, the safety latch comprising:

a latching member connected to the first handle, said latching member moving from a disengaged position to an engaged position, and said latching member comprising first and second opposite side walls, each of said first and second opposite walls having a proximal end and a distal end, and each of said first and second opposite walls having a pin through-opening at said proximal end;

a pin received within the pin through-opening of the first handle;

an end wall connected to said first and second opposite walls at said respective distal ends, said end wall configured to be received by said receiving member; and wherein said pin through-openings of said first and second opposite side walls are configured to receive said pin about which said latching member rotates from said disengaged position to said engaged position;

a biasing member for biasing said latching member in said disengaged position, said biasing member defining a spring comprising a first end;

a second end;

at least one coiled portion between said first end and said second end of said spring, said coiled portion residing around said pin; and a first coil proximal to said first said wall of said latching member for receiving said pin;

a second coil proximal to said second side wall at said latching member also for receiving said pin;

a strut portion between said first coil and said second coil, said strut portion being retained proximal to the first handle of the hand tool;

wherein said first and second opposite side walls of said latching member further each include a spring through-opening whereby said first end of said spring is received within said spring through-opening of said first side wall of said latching member, and said second spring is received within said spring through-opening of said second side wall of said latching member; and said spring being tensioned so as to bias said latching member such that said end wall of said latching member is oriented towards the first handle when said latching member is in said disengaged position;

a receiving member connected to the second handle for receiving said latching member in said engaged position, whereby the hand tool is maintained in its closed position when said latching member is engaged with said receiving member, said receiving member defining a hook;

and wherein said hand tool is biased in its open position by means of a spring positioned between said first and second handles, said spring having a first end connected to the first handle and a second end connected to the second handle.

\* \* \* \* \*